United States Patent [19]

Leverenz et al.

[11] 3,936,274

[45] Feb. 3, 1976

[54] SALT DISSOLVER CONSTRUCTION

[75] Inventors: Melvin E. Leverenz, St. Clair; Robert L. Vanderscors, Marysville, both of Mich.

[73] Assignee: Diamond Crystal Salt Company, St. Clair, Mich.

[22] Filed: Feb. 14, 1975

[21] Appl. No.: 549,772

[52] U.S. Cl. ........... 23/270 R; 23/272 AH; 423/208

[51] Int. Cl.²... B01D 11/02; B01F 1/00; C01D 3/08

[58] Field of Search ....... 23/272 AH, 270 R, 272 R, 23/271 R; 423/208

[56] References Cited

UNITED STATES PATENTS

| | | | |
|---|---|---|---|
| 700,972 | 5/1902 | Naef | 23/270 R |
| 1,807,263 | 5/1931 | Walters | 23/270 R |
| 2,058,300 | 10/1936 | Cramer | 23/272 AH |
| 2,281,140 | 4/1942 | Courthope | 23/272 AH |
| 2,412,106 | 12/1946 | Swartz | 23/272 AH |
| 3,343,919 | 9/1967 | Miller | 23/272 AH |
| 3,363,995 | 1/1968 | Driskell | 23/272 AH |
| 3,390,402 | 6/1968 | Goerg | 23/270 R |
| 3,634,229 | 1/1972 | Stanley | 23/272 AH |
| 3,738,814 | 6/1973 | Cloete | 23/270 R |
| 3,800,026 | 3/1974 | Morgan | 23/270 R |

FOREIGN PATENTS OR APPLICATIONS

| | | | |
|---|---|---|---|
| 613,271 | 1/1961 | Canada | 23/272 AH |
| 644,092 | 7/1962 | Canada | 23/270 R |

*Primary Examiner*—Jack Sofer
*Assistant Examiner*—S. J. Emery
*Attorney, Agent, or Firm*—Harness, Dickey & Pierce

[57] ABSTRACT

A new self-cleaning salt dissolver construction which includes a special dissolving zone which supports the salt for dissolution while at the same time permitting the collection of sludge-impurities in the dissolving zone such that the sludge-impurities can be removed by a special cleaning operation when desired, without requiring the removal of the salt bed from the dissolver.

19 Claims, 3 Drawing Figures

SALT DISSOLVER CONSTRUCTION

BACKGROUND OF THE INVENTION

This invention broadly relates to a new salt dissolver construction.

State of the art is indicated by U.S. Pat. Nos. 3,365,280; 3,374,098; and, 3,307,914.

In the past there has been a problem with salt dissolver constructions, for example of the type used to dissolve rock salt, wherein impurities present in the salt (typically 1–5% of impurities such as sludge, calcium sulfate, shale, etc., are present in the salt) collected near the bottom of the salt bed within the dissolver during the operation thereof and eventually require that the dissolver be drained and that the salt bed be shoveled out or removed therefrom in one manner or another so that the sludge-impurities can be cleaned out of the dissolver. This of course is a time-consuming, burdensome, and uneconomical procedure to have to carry out.

Accordingly, one object of the present invention is to provide a new self-cleaning salt dissolver construction which alleviates the above problem.

Another object of this invention is to provide a new salt dissolver construction suitable for use in dissolving rock salt, evaporated salt, solar salt, or any configuration thereof (i.e., numerous salt configurations can be molded therefrom).

Another object of the invention is to provide a new and improved rock salt dissolver construction.

Another object of this invention is to provide a new salt dissolver construction which utilizes a special salt dissolving zone which has a special self-cleaning system.

Another object of this invention is to provide a new salt dissolver construction which has a special collection chamber conduit for collecting the brine product from the dissolver which collection chamber can be removed from the dissolver tank and cleaned without the necessity of completely draining the dissolver or removing the salt from the dissolver.

Other objects, features and advantages of the present invention will become apparent from the subsequent description and the appended claims taken in conjunction with the accompanying drawings.

SUMMARY OF THE INVENTION

Figure 1:
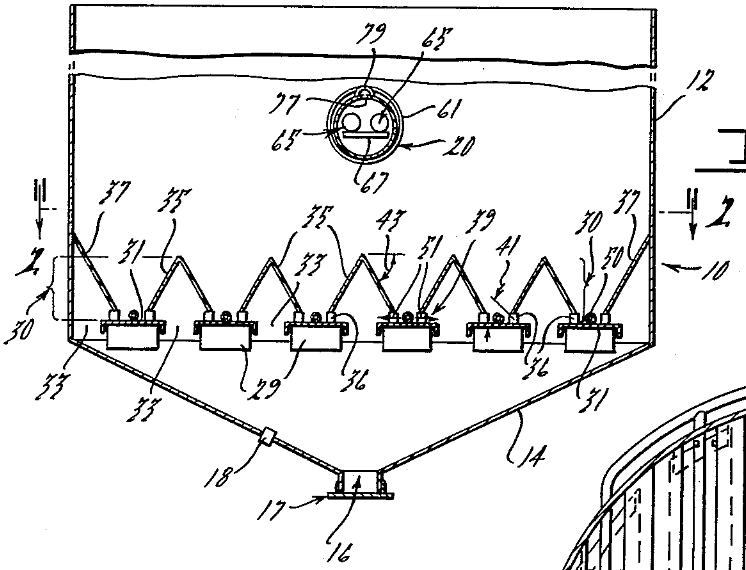
FIG. 1 illustrates an elevational view in cross section demonstrating a salt dissolver construction in accordance with this invention.

Broadly stated, the present invention comprises a new salt dissolver construction which is capable of self cleaning relative to sludge-impurities formed therein during dissolving, said construction comprising a tank for holding the salt therein, a generally conical bottom portion on said tank, a drain outlet near the lowermost part of the conical bottom, a water inlet near the lowermost portion of the conical bottom, a brine outlet means for removing dissolved salt in the form of brine from the tank and being located substantially above the bottom of the tank but below a liquid (e.g., aqueous, water, or the like) level maintained within said tank, which liquid level in turn is maintained below a salt level in said tank, dissolving zone means located generally near the top of said conical portion and operative to support the salt for dissolving therein while preventing flow of the salt into said conical portion, said dissolving zone means including a plurality of transverse metal fiberglass, plastic or other materials support member means positioned crosswise in the tank with spaces therebetween and operative to support the salt in the tank, a plurality of umbrella like means positioned over and overlapping said spaces and additionally being operative to support the salt in the tank and to prevent the salt from passing downwardly through said spaces, said overlapping being such that salt which falls downwardly over said umbrella means will pile up on said support members to form salt piles thereon which have an angle of repose sufficient to enable said salt to be retained on the support members without falling through said spaces; and water spray conduit means located just above said support members and adjacent to and below said umbrella means for periodically rinsing and cleaning out the sludge-impurities which collect in the dissolving zone after first draining all liquid from the tank through said drain outlet.

DESCRIPTION OF PREFERRED EMBODIMENTS

The drawing figures illustrate a preferred embodiment in accordance with the invention, wherein like numerals in different figures indicate like elements.

Figure 2:
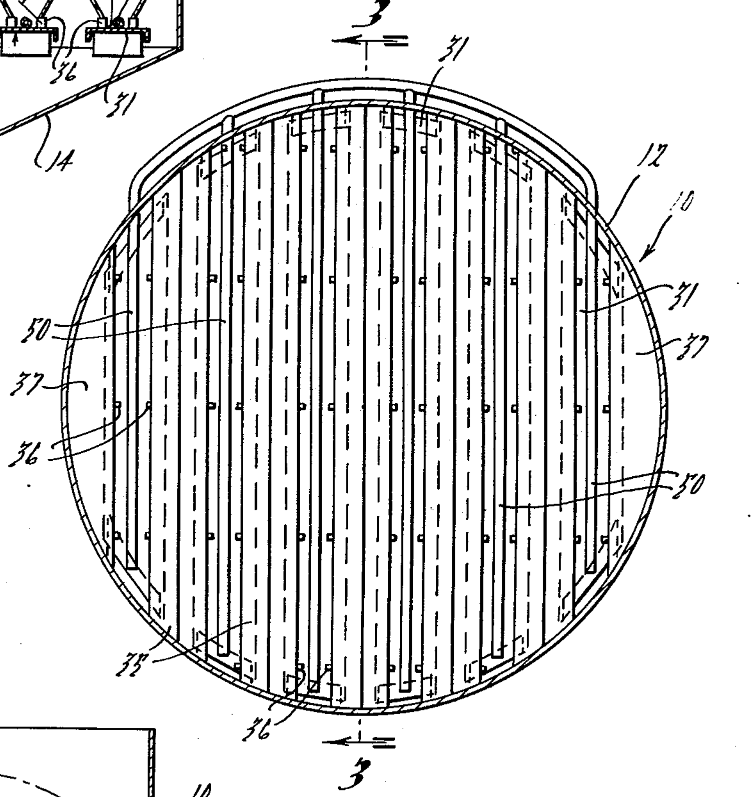
FIG. 2 illustrates a cross-sectional view taken along the line 2—2 of FIG. 1; and, FIG. 3 illustrates a cross-sectional view taken along the line 3—3 of FIG. 2.
Figure 3:
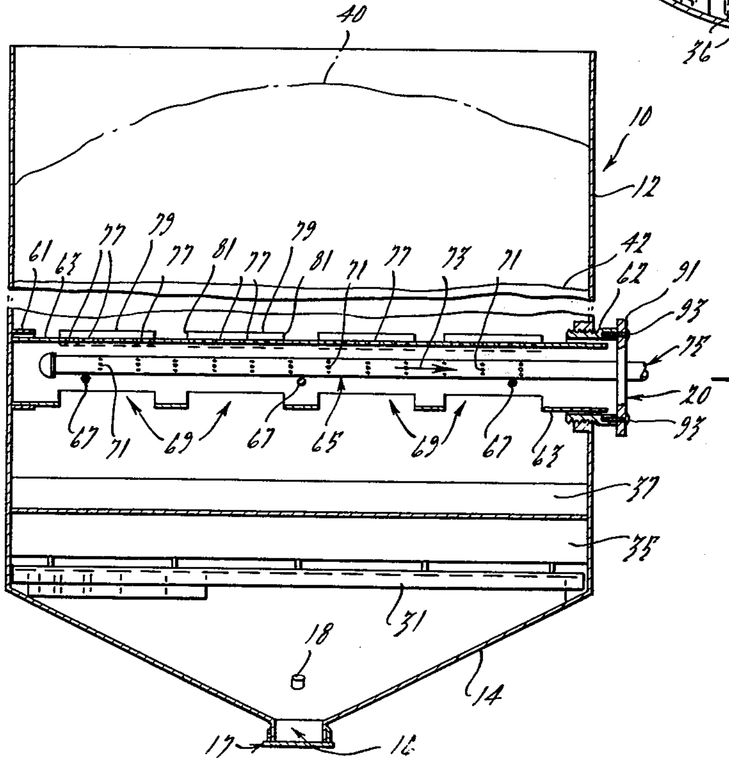

FIGS. 1, 2 and 3 show a salt dissolver in accordance with this invention designated 10 which is comprised of a tank 12, a conical bottom portion 14, a drain outlet 16 which includes a removable cover 17 of any suitable construction, a water inlet 18, a brine outlet designated 20, and a dissolving zone portion designated 30.

As shown in FIG. 3, a salt level designated 40 is maintained within the dissolver 10 and a liquid level designated 42 is maintained as shown beneath the salt level 40 and above the brine outlet 20, with the water being continuously or intermittently introduced through the water inlet 18 and the brine product being continuously or intermittently withdrawn through the brine outlet 20.

The salt dissolving zone portion 30 includes a plurality of transverse support members 31 positioned crosswise within the tank 12 with spaces 33 between each support member 31. There are also a plurality of umbrella like members 35 positioned over and overlapping said spaces 33 and these umbrella members 35 in combination with the side umbrella members 37 function to support the salt in the tank and prevent the salt from passing downwardly through said spaces 33. Support members 36 act to support the umbrella members 35. It is to be noted that the overlapping is such that when the salt falls downwardly over said umbrella members 35 (e.g., when the tank 12 is loaded in a dry condition before initiating upward water flow) that the salt will pile up on said metal support members 31, with the salt pile being shown as designated at 39 in FIG. 1 and the salt pile will generally form an angle of repose of approximately 45° as shown at 41 in FIG. 1. This angle of repose should preferably be within the range of about 40° to about 60° depending on the type of salt being dissolved in the dissolver. Preferably this angle of repose will be maintained within the range of approximately 42°–50°. Best results in the dissolving of rock salt (NaCl) are obtained with an angle of repose of about 45° as designated at 41 in FIG. 1.

This angle of repose as designated at 41 is chosen such that it will be sufficient to enable the salt to be retained on the metal support members 31 without falling through the spaces 33.

The blocks 29 are securely fastened in any suitable manner to the side of the tank 12 and these blocks 29 act to support the transverse support members 31.

It is to be noted that the dissolving zone 30 also includes water spray conduit members 50 which water spray conduits 50 are located just above the support members 31 but adjacent to and below the lower part of the umbrella members 35 and 37. These water spray conduits 50 function to periodically spray water, generally in a horizontal outward direction as indicated by the arrows 51 in order to periodically rinse away and clean out the sludge-impurities which collect at the bottom of the dissolving zone. The water spray conduits are activated after first draining all liquid from the tank through the drain outlet 16. It is also to be noted that the downwardly inclined angle 43 (as shown in FIG. 1) for the sides of the umbrella members 35 should be steep enough such that the angle 43 will cause the sludge to slide down the umbrella members so that the sludge is generally collected and ready for removal at the bottom of the dissolving zone 30. The angle 43 preferably should be about 60°, however, broadly the angle 43 may be within the range of about 50° to about 70°.

Still further, it should be noted that substantial self-cleaning of this new dissolver construction can be carried out by shutting off the inlet water flow at 18, and then dropping or drawing the liquid from the tank 12 without ever turning on the water sprays 50. However, the preferred self-cleaning operation utilizes the sprays 50.

The brine collection chamber or outlet designated 20 includes a ring like support element 61 which supports a first inner conduit 63 which extends transversely across the tank 12. Within the conduit 63 there is a collection chamber pipe 65 supported within the conduit 63 by transverse support rods 67. Several large openings designated 69 are present on the bottom side of the conduit 63 to permit the entry of brine into the collection chamber 65. The brine passes upwardly through the opening 69 and into the collection chamber pipe 65 with the brine entering the conduit 65 through the small porous plastic filters 71. These porous plastic filters have numerous small holes therein with a pore size within the range of approximately 250 microns to about 500 microns in size. The porous plastic filters are inserted in holes formed in the conduit 65. As an alternative to the porous plastic filters inserted as shown at 71, there may be used instead a sleeve which completely covers the conduit 65 with the sleeve being made entirely of the plastic porous material having a pore size within the range of about 250 to about 500 microns and with the conduit 65 then simply being formed with a high number of holes therein. The brine once passing into the conduit 65 is removed in the direction of the arrow 73 through the outlet pipe 75 for collection as brine product. It is also to be noted that the upper side of the conduit 63 is formed with numerous additional openings therein designated 77 with there being four sets of these openings 77 as shown in FIG. 3. Each set of four openings 77 is covered by a second umbrella like member designated 79 which may be welded or otherwise suitably attached to the conduit 63 to cover the openings 77. The second umbrella member also acts to vent air and oil. It is to be noted that the angle of repose for the salt piles up adjacent the ends 81 of these umbrella members 79 is such that the angle of repose designated 81 is sufficient to prevent the salt from flowing through the openings 77. This angle of repose 81 should also be within the broad range of about 40° to about 60° and preferably within the range of about 42° to about 50°. Best results are obtained when this angle of repose is maintained at about 45° for the dissolving of rock salt. The brine outlet means 20 also include a removable lid designated 91. This lid 91 is suitably connected to the support conduit 62 by any suitable means such as screws 93. The support conduit 62 acts to support the right hand end of the conduit 63 in cooperation with the support member 61. The removable lid 91 permits removal of the collection chamber pipe 65 for cleaning of same, that is for example, the filters 71 can be cleaned and any sludge-impurities which collect on the small filters 71 can be removed. It is to be noted that this cleaning of the collection chamber pipe 65 can be carried out while the tank is fully loaded with salt because the conduit 63 and the umbrella members 79 support the salt above the collection chamber pipe 65 and permit the removal of same from the tank when the lid 91 is removed.

The salt to be dissolved in the dissolver of this invention is generally of the sodium chloride salt type, that is, rock salt, evaporated salt, solar salt, or any configuration thereof. Excellent results have been obtained utilizing a salt dissolver construction essentially as shown in the drawings.

The advantages of the invention should be fairly apparent from the disclosure set forth above. However, certain specific advantages are as follows. First, utilizing the salt dissolver of this invention it is possible to carry out a much more efficient salt dissolving operation wherein considerably less water usage is required than in prior salt dissolvers. Second, the salt dissolver of this invention requires considerably less disposal gallonage of impure brine. Third, the salt dissolver of this invention can be automated for labor savings. Fourth, for reasons explained above the salt dissolver of this invention is self-cleaning. Fifth, the salt dissolver herein requires essentially no moving parts in the makeup of its basic construction. Sixth, the salt dissolver herein makes a higher purity brine and the dissolver construction is adaptable to numerous different kinds of salt. Seventh, the salt dissolver herein is capable of saving approximately 34–40 tons of salt per day in large scale salt dissolving operations wherein approximately 30–40 tons of salt per hour are dissolved. This is possible in that prior large salt dissolving tanks had to be cleaned out at least twice per day. This cleaning out operation was time-consuming in that the prior salt tanks had to be drained and salt removed therefrom before the sludge-impurities could be removed. Utilizing the salt dissolver construction of this invention such a time-consuming clean-out is not required.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A new salt dissolver construction which is capable of self cleaning relative to sludge-impurities formed therein during dissolving, said construction comprising:
a tank for holding the salt therein,
a generally conical bottom portion on said tank,
a drain outlet near the lowermost part of the conical bottom,
a water inlet near the lowermost portion of the conical bottom,
a brine outlet means for removing dissolved salt in the form of brine from the tank and being located substantially above the bottom of the tank but below a liquid level maintained within said tank, which liquid level in turn is maintained below a salt level in said tank,
dissolving zone means located generally near the top of said conical portion and operative to support the salt for dissolving therein while preventing flow of the salt into said conical portion,
said dissolving zone means including, a plurality of transverse support
member means positioned crosswise in the tank with spaces therebetween and operative to support the salt in the tank,
a plurality of umbrella like means positioned over and overlapping said spaces and additionally being operative to support the salt in the tank and to prevent the salt from passing downwardly through said spaces,
said overlapping being such that salt which falls downwardly over said umbrella means will pile up on said support members to form salt piles thereon which have an angle of repose sufficient to enable said salt to be retained on the support members without falling through said spaces;
and water spray conduit means located just above said support members and generally adjacent to and below said umbrella means for periodically rinsing and cleaning out the sludge-impurities which collect in the dissolving zone after first draining all liquid from the tank through said drain outlet.

2. The invention of claim 1 wherein,
said angle of repose is approximately 45° and said umbrella means form a downwardly inclined angle of about 60° to permit the sludge-impurities to slide down and be collected on the support member means.

3. The invention of claim 1 wherein,
said brine outlet means includes, a removable collection chamber conduit means through which the brine is collected and removed and which collection chamber can itself be removed for cleaning.

4. The invention of claim 3 wherein,
said brine outlet means is covered by a second umbrella like means to prevent salt from falling on said collection chamber and vent air and oil.

5. The invention of claim 3 wherein,
said collection chamber conduit means includes porous plastic filter means having a pore size of about 250 microns to about 500 microns.

6. The invention of claim 1 wherein,
said angle of repose is between about 40° and about 60°.

7. The invention of claim 1 wherein,
said angle of repose is between about 42° and about 50°.

8. The invention of claim 1 wherein, said salt is of the NaCl type and is selected from at least one of the group consisting of rock salt, evaporated salt, solar salt, and
any salt configuration made therewith.

9. The invention of claim 1 wherein,
said salt is rock salt.

10. A new salt dissolver construction which is capable of self cleaning relative to sludge-impurities formed therein during dissolving, said construction comprising:
a tank for holding the salt therein,
a generally conical converging bottom portion on said tank,
a drain outlet near the lower part of the bottom,
a brine outlet means for removing dissolved salt in the form of brine from the tank and being located substantially above the bottom of the tank but below a liquid level maintained within said tank, which liquid level in turn is maintained below a salt level in said tank,
dissolving zone means located generally near the top of said bottom portion and operative to support the salt for dissolving therein while preventing flow of the salt into said bottom portion,
said dissolving zone means including,
a plurality of support member means positioned crosswise in the tank with spaces therebetween and operative to support the salt in the tank,
a plurality of umbrella like means positioned over and overlapping said spaces and additionally being operative to support the salt in the tank and to prevent the salt from passing downwardly through said spaces,
said overlappping being such that salt which falls downwardly over said umbrella means will pile up on said support members to form salt piles thereon which have an angle of repose sufficient to enable said salt to be retained on the support members without falling through said spaces,
water spray conduit means for periodically rinsing and cleaning out the sludge-impurities which collect on the support member means after first draining all liquid from the tank through said drain outlet.

11. The invention of claim 10 wherein,
said angle of repose is approximately 45° and said umbrella means form a downwardly inclined angle of about 60° to permit the sludge-impurities to slide down and be collected on the support member means.

12. The invention of claim 10 wherein,
said brine outlet means includes,
a removable collection chamber conduit means through which the brine is collected and removed and which collection chamber can itself be removed for cleaning.

13. The invention of claim 12 wherein,
said brine outlet means is covered by a second umbrella like means to prevent salt from falling on said collection chamber, and vent air and oil.

14. The invention of claim 12 wherein,
said collection chamber conduit means includes porous plastic filter means having a pore size of about 250 microns to about 500 microns.

15. The invention of claim 10 wherein,
said angle of repose is between about 40° and about 60°.

16. The invention of claim 10 wherein, said angle of repose is between about 42° and about 50°.

17. The invention of claim 10 wherein,
said salt is of the NaCl type and is selected from at least one or a mixtures of the groups consisting of rock salt, evaporated salt, solar salt, and any salt configuration made therewith.

18. The invention of claim 10 wherein,
said salt is rock salt.

19. The invention of claim 10 wherein,
said construction also includes,
water spray conduit means located just above said support members and generally adjacent to and below said umbrella means for periodically rinsing and cleaning out the sludge-impurities which collect in the dissolving zone after first draining all liquid from the tank through said drain outlet.

* * * * *